Nov. 28, 1967 W. T. SHREVE 3,354,773
AUTOMATIC OPTICAL PYROMETER SYSTEM WITH AUTOMATIC GAIN CONTROL
Filed July 1, 1963 2 Sheets-Sheet 1
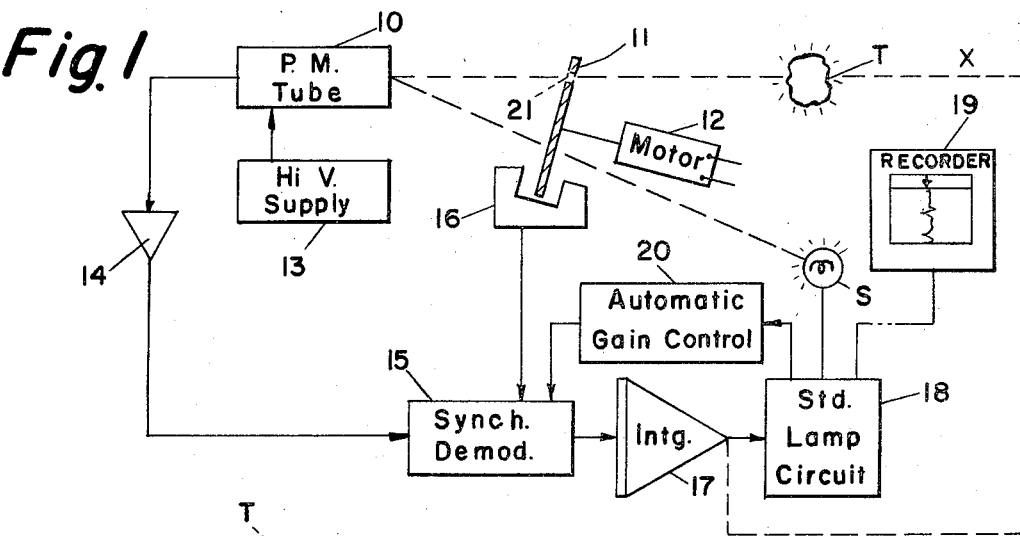
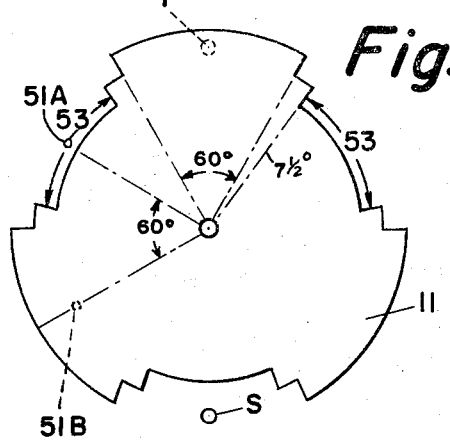
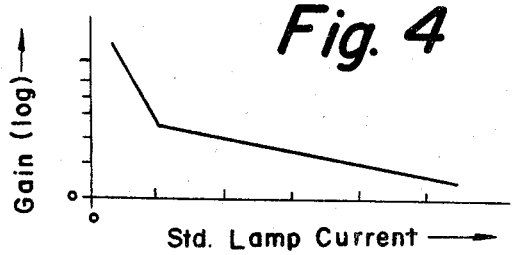
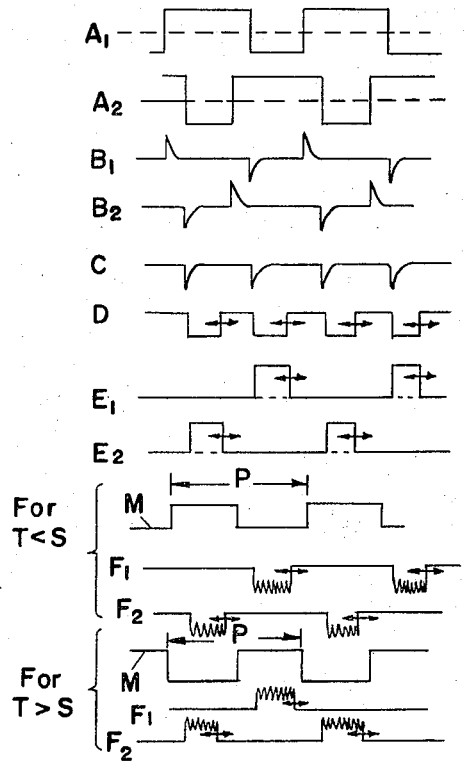

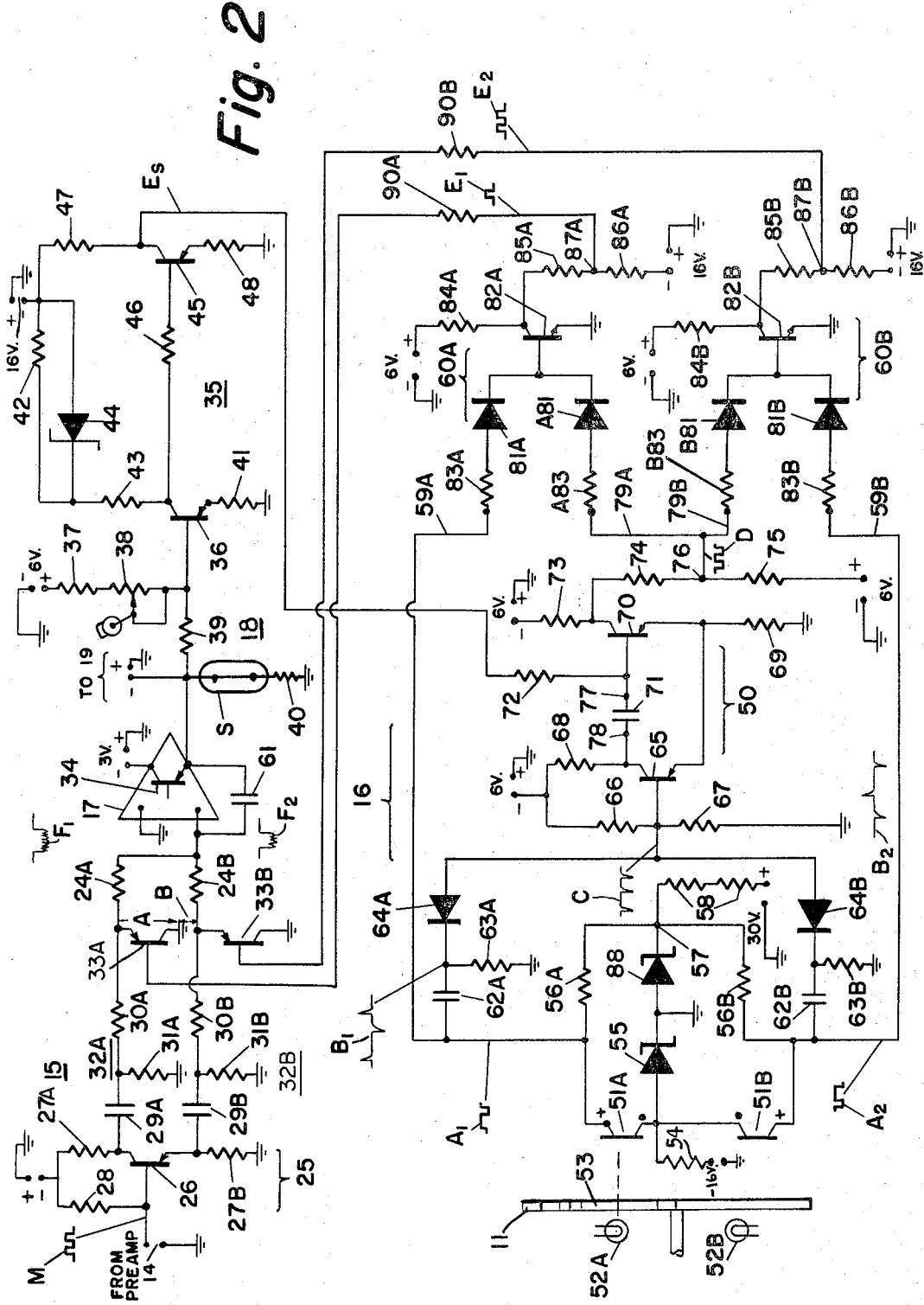

United States Patent Office 3,354,773
Patented Nov. 28, 1967

3,354,773
AUTOMATIC OPTICAL PYROMETER SYSTEM WITH AUTOMATIC GAIN CONTROL
Warren T. Shreve, Maple Glen, Pa., assignor to Leeds & Northrup Company, a corporation of Pennsylvania
Filed July 1, 1963, Ser. No. 291,868
8 Claims. (Cl. 88—22.5)

This invention relates to balancing systems having automatic gain control and particularly relates to gain control circuitry for automatically-balanced optical pyrometer systems.

To maintain optimum balancing characteristics of an automatic pyrometer system, it is necessary that the system gain be decreased with increase of target temperature to offset the disproportionate increase of radiant power of the target with increase of target temperature. It has been proposed to control the system gain by varying the high voltage applied to the dynodes of a photomultiplier tube in such system, but such arrangement has not been satisfactory because of sluggishness of control due to filter capacitors of the high-voltage dynode supply and because of disadvantages inherent in control of high voltages. It has also been proposed to control the system gain by varying an impedance in the preamplifier following the photomultiplier tube, but such arrangement does not afford a suitably wide dynamic range.

In accordance with the present invention, the change in system gain is effected by structure which varies, as a function of the standard lamp current, the ON–OFF times of electronic switch-means serving as the synchronous demodulator of the mismatch or error signal whose amplitude and phase are made dependent upon the difference between radiant energies from the target and from the standard lamp. Such arrangement provides rapid rebalancing of the standard lamp current without overshoot, involves only low voltages, and affords a wide range of gain control.

More specifically, the demodulator is controlled by timing pulses which are phase-locked to the error signal and whose duration is inversely related to the standard lamp current so that the demodulator output consists of unidirectional pulses whose amplitude is dependent upon the difference between the radiant energies from the target and from the standard lamp, whose polarity is dependent upon which of such energies is the greater, and whose duration is dependent upon the magnitude of the standard lamp current.

More particularly, the standard lamp circuitry includes a function generator which for a given change in lamp current effects a greater change in the timing pulse length for lower lamp current levels than for higher lamp current levels in compensation for the disproportionate increase of target radiation with increase of target temperature.

The invention further resides in amplifier systems having features of combination and arrangement hereinafter described and claimed.

For a more detailed understanding of the invention, reference is made to the following description and to the attached drawings in which:

FIG. 1 is a block diagram of an automatic pyrometer system;

FIG. 2 is a schematic of preferred circuitry for components of the system of FIG. 1;

FIG. 3 is a front view of a light-modulator disc suited for the systems of FIGS. 1 and 3;

FIG. 4 is exemplary of a system gain/lamp current characteristic plotted with a logarithmic scale for gain and a linear scale for standard lamp current; and FIG. 5 is an explanatory figure referred to in discussion of the operation of the systems for FIGS. 1 and 2.

Referring to the block diagram of FIG. 1, the modulator discs 11 driven by motor 12 alternately permits radiant energies from the target T and from the standard lamp S to be received by the photoemissive surface of the photomultiplier tube 10. With suitably high DC voltage supplied by source 13 to the dynodes of tube 10, the periodically varying light received by the tube is converted to a pulsating signal whose AC component is of frequency determined by the speed of disc 11. With the particular disc construction shown in FIG. 3 rotated at 1800 r.p.m., the frequency of such AC signal is 90 c.p.s.

The magnitude of the AC component of the output of tube 10 is dependent upon the existing mismatch between the light energies from the target T and the standard lamp S. The relative phase relation between the halfwaves of such signal depends upon which of the light energies is the greater. After amplification by a suitable preamplifier 14, the mismatch or error signal is applied to one of the input circuits of the demodulator 15. Synchronous operation of the demodulator 15 is obtained by applying to another of its input circuits a timing wave derived by the drive circuit 16 from the modulator disc 11 to phase-lock the demodulator 15 to the mismatch signal.

The output signal of the synchronous demodulator 15 is a succession of unidirectional pulses applied to the integrator 17. The output of the integrator as supplied to a standard lamp circuit 18 changes the lamp current in sense to reduce the difference between the filament temperature of the lamp S and the temperature of the target T until the difference in their radiant energy levels is too small to be detectable by the system. At such steady-state condition, the system is considered to be in balance. Under steady-state conditions, the feedback circuit forming an inherent part of the integrator is effective upon any spurious change of lamp current to produce an input signal which restores the lamp current to its balance value.

In systems in which the standard lamp is to be a fixed reference, the output of the integrator can be used to vary the temperature of the target as schematically indicated by dotted line X in FIG. 1.

The standard lamp current is monitored by the indicator recorder 19 or equivalent metering device whose scale or chart may be calibrated in terms of temperature or more generally in terms of lamp-current for reference to a current/temperature chart. Thus at system balance, the reading of the instrument 19 is indicative of the existing target temperature. To obtain optimum balancing characteristics, i.e., rapid response with freedom from overshoot; over a wide range of target temperatures, for example, from 1400° F. to 2250° F., it is provided that the standard lamp current continuously affords a reference level for the gain control circuit 20. The resulting output of circuit 20 is applied to the synchronous demodulator 15 to vary the relative duration of the periods for which it alternately presents high and low impedance to passage of mismatch signals from preamplifier 14 to the integrator 17. For a mismatch signal of any particular amplitude, the gain of the system depends upon that portion of the temperature range in which the target temperature is varying and is lower for the higher temperatures. Moreover, the change in gain is not a linear function of standard lamp current but is greater at the lower current values, as shown for example by the curve of FIG. 4 which is more fully discussed in connection with FIG. 2.

Now referring to FIG. 2 for illustration of suitable and preferred circuitry for the system of FIG. 1, the demodulator 15 includes the inverter circuit 25 comprising transistor 26, whose equal load resistors 27A, 27B form two signal output channels between ground and the emitter and collector electrodes of that transistor. The DC bias component for the base electrode of transistor 26 is derived from resistors 28 and 27B, the former being connected between the base and the negative terminal of the DC supply source. The mismatch or error signal from the preamplifier 14 is supplied between ground and the base of transistor 26 and accordingly produces, at the collector and emitter, two mismatch signals of similar AC amplitude but 180° out of phase.

The collector-current circuit of transistor 26 is coupled to the channel A input of integrator 17 by the network 32A comprising a DC blocking series-capacitor 29A, series resistors 24A, 30A and the shunt resistor 31A. The emitter-current circuit of transistor 26 is similarly coupled to the channel B input of integrator 17 by the network 32B comprising series-capacitor 29B, the series-resistors 24B, 30B and shunt resistor 31B. The commutating or switching transistors 33A, 33B are respectively connected across the A and B input channels. The integrator 17 is a multistage amplifier with capacitive feedback afforded by capacitor 61 for integration of the positive or negative pulses passed by the transistors 33A, 33B.

With transistor 33A switched ON, as later described, only the halfwave mismatch signal appearing in channel B for the OFF period of transistor 33B is supplied to the integrator 17. Conversely, for the ON period of transistor 33B, only the halfwave mismatch signal appearing in channel A for the OFF period of transistor 33A is supplied to the integrator 17.

The output transistor 34 of integrator 17 is in an emitter-follower circuit with the standard lamp S connected between emitter and ground. The standard lamp current is monitored by a function generator 35. The base-ground bias of the input transistor 36 of the function generator 35 is derived from the potential-divider circuit comprising fixed resistor 37, variable resistor 38, fixed resistor 39, the standard lamp S and the resistor 40 as connected in series between ground and the positive terminal of the biasing source. An opposing component of the total base-emitter bias is produced by flow of collector-emitter current through resistor 41 connected between ground and the emitter of transistor 36.

For lower target temperatures, at which system balance is maintained at correspondingly low currents of the standard lamp, both of load resistors 42, 43 are effectively included in the collector circuit of the transistor 36 so to effect a relatively large change in the DC potential of its collector for a given change in target temperature or lamp current. With increase of target temperature and therefore of standard lamp current, the output of transistor 36 correspondingly increases until the voltage drop across load resistor 42 exceeds the breakdown voltage of the shunt Zener diode 44. Thus, for still higher target temperatures, the effective load resistance for transistor 36 is that of resistor 43 alone and the transistor operates along a different load line of lesser slope with a correspondingly smaller change in DC potential of its collector for further given increase in target temperature or standard lamp current. In short, the transistor 36 of function generator 35 serves as a DC amplifier having a high gain characteristic for the lower portion of the range of standard lamp current and having a lower gain characteristic for the higher portion of the range of standard lamp current.

The base of the output transistor 45 of the function generator 35 is directly coupled by resistor 46 to the collector of the input transistor 36. The output transistor 45 also operates as a DC amplifier but with a fixed gain characteristic determined by the values of resistors 47, 48. The output of the function generator 35 is a DC voltage level $E_S$ whose relation to the standard lamp current, as illustrated in FIG. 4, is that of two lines of different slope meeting to form a knee in the curve at the standard lamp current values for which the Zener diode 41 breaks down. The location of the knee in the semi-log gain curve of FIG. 4 may be varied by adjustment of rheostat 38. The output of the function generator 35 is applied as a variable bias for a one-shot multivibrator 50 included in the demodulator drive circuit 16.

As shown in FIG. 2, the drive circuit 16 includes a pair of phototransistors 51A, 51B, or equivalent, positioned adjacent the modulator disc 11, or equivalent structure, rotating in synchronism therewith. The phototransistors 51A, 51B may be of the 2N-1392 type: their base electrodes are left unconnected so that they function as photo-diodes. The inner slots 53 of disc 11 (FIGS. 2, 3) permit passage of light alternately from the bulbs 52A, 52B to the corresponding phototransistors 51A, 51B. For each cycle of the modulation effected by disc 11, the light from bulb 52A is passed by one of the notches 53 to the phototransistor 51A for a period of time preferably beginning somewhat after the photomultiplier tube 10 receives a light pulse from the standard lamp S and ending sometime before termination of that pulse; similarly, the light from bulb 52B is passed by one of the notches 53 to the phototransistor 51B for a period of time beginning after the photomultiplier tube 10 receives a light pulse from the target T and ending somewhat before termination of that pulse. The resulting timing-pulse outputs A1, A2 (FIG. 5) of the photomultipliers 51A, 51B are each non-symmetrical square waves which are so phased that the narrow pulses of one are in time symmetry with the wide pulses of the other. The narrow pulses of the timing signals are narrower than the halfwaves of the error signal M effectively to eliminate switching transients in the output of the preamplifier 14 from appearing in the error signal input passed by the demodulator 15 to the integrator 17.

The negative electrodes of the phototransistors 51A, 51B are connected through the resistor 54 to the negative terminal of a supply source indicated and to the ungrounded electrode of the Zener diode 55. The positive electrodes of the phototransistors 51A, 51B are connected via resistors 56A, 56B respectively to the junction point 57 which is connected via resistors 58 to the positive terminal of a current supply source. The Zener diode 88 connected between the junction point 57 and ground is poled to limit the positive swing of the point 57 with respect to ground. In effect, the Zener diodes 55, 88 serve to regulate or hold constant the supply voltages at point 57 and the common terminal of the phototransistors 51A, 51B or equivalent.

The output pulses A1, A2 of the phototransistors 51A, 51B are respectively applied to the input lines 59A, 59B of logic circuits 60A, 60B. The output pulses A1 are also differentiated by the network comprising capacitor 62A and resistor 63A to produce the pulse train B1 (FIG. 5) of alternating positive and negative spikes corresponding respectively with the leading and trailing edges of the pulses A1. The diode 64A passes only the negative spikes to the base of the input transistor 65 of the one-shot multivibrator 50. Similarly, the output pulses A2 of phototransistor 51B are also differentiated by the network comprising capacitor 62B and resistor 63B to produce the series B2 of positive and negative spikes corresponding with the leading and trailing edges of pulses A2. The diode 64B passes only the negative spikes to the base of the input transistor 65 of one-shot multivibrator 50.

The two series of negative spikes respectively passed by the diodes 64A, 64B are combined to provide a train C (FIG. 4) of equally spaced negative spikes which serve as sharp trigger pulses each initiating a cycle of the one-shot multivibrator 50. The operating bias point for the base of the input transistor 65 of the multivibrator 50 is derived from the potential-divider circuit formed by resistors 66, 67 connected between ground and the negative terminal of the biasing sources. The collector-emitter circuit of transistor 65 includes the load resistor 68 and also the load resistor 69 common to the emitter-ground circuit of both the input transistor 65 and the output transistor 70 of the multivibrator. The base of the output transistor 70 is coupled to the collector of the input of transistor 65 by the capacitor 71; it is also connected through resistor 72 to the output circuit of the function generator 35. The collector of the output transistor 70 of multivibrator 50 is connected to the negative terminal of one supply source by the resistor 73 and to the positive terminal of a second supply source by the output voltage-divider formed by resistors 74, 75.

With the multivibrator 50 in the OFF state, its input transistor 65 is non-conductive and its output transistor 70 is conductive. For this state, the output terminal 76 of the multivibrator is positive with respect to ground. Also for this state, the base-connected terminal 77 of capacitor 71 is positive with respect to its collector-connected terminal 78.

When the multivibrator 50 is switched ON by one of the trigger pulses C, the input transistor 65 is immediately switched to the ON state. When the input transistor 65 is switched ON, its collector potential rises and this rise as transmitted by capacitor 71 turns OFF the transistor 70. In consequence at fixed time in the modulation cycle, the potential of the output terminal 76 of the multivibrator immediately falls to ground potential or slightly below to form the leading edge of one of the output pulses D. With the terminal 78 of capacitor 71 now effectively connected at a potential close to ground, the capacitor 71 charges at a rate dependent upon the output level $E_S$ of the function generator 35 as established by the standard lamp current. As the capacitor 71 charges, the base potential of the output transistor 70 becomes less and less positive until it attains a value for which the output transistor 70 is switched to the ON state by the bias $E_S$ so to form the trailing edge of one of the output pulses D. At essentially the same time, the input transistor 65 is switched to the nonconductive state so as to complete a cycle for the multivibrator. The time of occurrence in the modulation cycle of the trailing edge of each output pulse D is a variable dependent upon standard lamp current.

The duration of the output pulse D of multivibrator 50 is therefore dependent upon the standard lamp current as amplified by the function generator; i.e., the greater the lamp current, the narrower the output pulses. It is to be noted that the repetition frequency of the multivibrator is twice that of the AC components of the output signal of the preamplifier 14, i.e., there is a multivibrator output pulse D for each halfwave of the error signal M. The output pulses D of the multivibrator 50 are applied to the input lines 79A, 79B of the logic circuit 60A, 60B which form part of the drive circuit 16 for the transistors 33A, 33B of demodulator circuit 15.

The logic circuit 60A is a gate comprising a pair of diodes 81A, A81 and the transistor 82A. The anode of diode 81A is connected through resistor 83A to the line 59A on which appear the output pulses A1 of phototransistor 51A. The anode of diode A81 is connected through resistor A83 to the output terminal 76 of multivibrator 50 at which appear the double frequency pulses D. The cathodes of both diodes 81A, A81 are connected to the base of the transistor 82A, which for the diode poling and source polarities indicated is of the NPN type. The emitter of transistor 82A is connected to ground. The collector of transistor 82A is connected to the positive terminal of one source through resistor 84A and to the negative terminal of a second source through the resistors 85A, 86A which form a potential divider having an output terminal 87A.

For each modulation cycle provided by the modulator disc 11, the input diode 81A of logic circuit 60A receives a positive pulse and a negtaive pulse (waveform A1—FIG. 5) from the phototransistor 51A and the input diode A81 of logic circuit 60A receives two negative pulses (waveform D—FIG. 5) from the multivibrator 50. Thus, for that interval of the demodulation cycle for which both diodes 81A, A81 are negative, the associated transistor 82A is OFF and a single positive pulse $E_1$ (FIG. 5) is produced at the output terminal 87A. The duration of this pulse $E_1$ is dependent upon the standard lamp current as repeated by the function generator 35 and as applied to the multivibrator 50 to terminate its cycle.

The logic circuit 60B is also a gate and comprises a pair of diodes 81B, B81 in the base circuit of transistor 82B. The anode of diode 81B is connected via resistor 83B to the output line 59B of phototransistor 51B and the anode of diode B81 is connected via resistor B83 to the output line 79B of multivibrator 50. The emitter of transistor 82B is connected to ground. The collector of transistors 82B is connected to the positive terminal of one power source through resistor 84B and to the negative terminal of a second source through the resistors 85B, 86B which form a potential divider having an output terminal 87B.

For each modulation cycle provided by modulator 11, the input diode 81B of logic circuit 60B receives a positive pulse and a negative pulse (waveform A2—FIG. 5) from the photomultiplier 51B and the input diode B81 receives two negative pulses (waveform D—FIG. 5) from the multivibrator 50. For that interval of the demodulator cycle for which both diodes 81B, B81 are negative, the associated transistor 82B is OFF and a single positive output pulse $E_2$ is produced at the output terminal 87B. The length of output pulse $E_2$ is also dependent upon the standard lamp current as repeated by the function generator 35 and applied to the multivibrator 50 for termination of its cycle.

The timing output pulses $E_1$, $E_2$ of the logic circuits 60A, 60B are respectively applied via resistors 90A, 90B to the base circuits of the transistors 33A, 33B of demodulator 15 to switch them in synchronism with the AC component of the output of photomultiplier tube 10 or equivalent.

Assuming an existing mismatch of the radiant energies from target T and lamp S for that half of each modulation cycle for which light from the standard lamp S is passed by the modulator, the channel B input of the integrator 17 receives no signal because it is effectively short-circuited by the transistor 33B and the channel A input of integrator 17 receives a unidirectional pulse for that fraction of the halfwave for which the transistor 33A is switched to the OFF state by a pulse $E_1$ from drive circuit 16. For the other half of each modulation cycle for which light from the target is passed by the modulator, the channel A input of integrator 17 is effectively short-circuited by transistor 33A; the channel B input of the integrator receives a unidirectional pulse for that fraction of the halfwave for which the transistor 33B is switched to the OFF state by the next $E_2$ pulse from the drive circuit 16.

Thus, for each successive modulation cycle, the integrator 17 receives two pulses of similar polarity and amplitude and of duration dependent upon the level of the standard lamp current. If the radiant energies are matched, the applied signals ($F_1$, $F_2$) are of zero amplitude, their integrated difference is zero, the standard lamp current remains unchanged, and the recorder or meter 19 indicates an unchanged target temperature. Assuming an increase in target temperature, i.e., $T > S$ (FIG. 5), the output signals $F_1$, $F_2$ of the demodulator 15 are of positive polarity and the lamp current is automatically increased to restore the energy balance and the meter comes to balance at a new reading, indicating higher temperature. As balance is approached at the higher temperature, the function generator 235 reduces the gain of the system by narrowing the timing pulses $E_1$, $E_2$ in compensation for the disproportionate increase of target energy with increase in temperature and so avoids overshooting of the balance point. As shown in FIG. 4, the change in gain for a given change in lamp current is much greater in the range of low lamp currents than in the range of high lamp currents so that the overall gain characteristic, at least to a first approximation, compensates for the effect of the rising non-linear relationship between increase of target radiation and target temperature upon automatic balancing of the system. The same effects occur in reverse sense when the target temperature falls below its previous value for production of demodulator output pulses $F_1$, $F_2$ of negative polarity (i.e. $T<S$—FIG. 5).

In résumé of the operation of FIG. 2, for each modulation cycle P (FIG. 5), the error signal M applied to the inverter section of the demodulator 15 comprises, in either sequence, a positive and a negative halfwave. If radiation from the target exceeds that from the standard lamp, the first halfwave is a negative pulse and the second halfwave is a positive pulse (see FIG. 5 for $T>S$) whereas if radiation from the standard lamp exceeds that from the target, the first halfwave is a positive pulse and the second halfwave is a negative pulse (see FIG. 5 for $T<S$).

During the first half-cycle of the modulator, the transistor 33B of the demodulator 15 is switched OFF by timing pulses $E_2$ (FIG. 5) of duration dependent upon the standard lamp current. The resulting unidirectional signal pulse $F_2$ passed to the integrator 17 during this period is of amplitude dependent upon that of the error signal, of polarity dependent upon that of the first halfwave of the error signal (see $F_2$ of FIG. 5 for $T<S$ and for $T>S$), and of duration dependent upon the level of the standard lamp current. During this halfwave, the transistor 33A remains ON and so blocks passage of the first halfwave of the mismatch signal to the integrator by way of network 32A.

During the second halfcycle of the modulator, the transistor 33A of demodulator 15 is switched OFF by a timing pulse $E_1$ of duration dependent upon the standard lamp current. The resulting unidirectional signal pulse $F_1$ passed to the integrator 17 during this period is of amplitude dependent upon that of the error signal, of polarity dependent upon that of the second halfwave of the error signal inverted by inverter circuit 35 (see $F_1$ of FIG. 5 for $T<S$ and for $T>S$) and of duration dependent upon the level of the standard lamp current. During this halfcycle of the modulator, the transistor 33B remains ON and so blocks passage of the second halfwave of the mismatch signal to the integrator by way of the network 32B.

Thus, if the target radiation exceeds that of the reference lamp, two positive pulses $F_1$, $F_2$ are applied to the integrator per modulation cycle to increase the standard lamp current for balance of the radiation. Conversely, if the target radiation is less than that of the lamp current, two negative pulses $F_1$, $F_2$ are supplied to the integrator per modulation cycle to decrease the standard lamp current for balance of the radiation. In all cases, the duration of the input pulses to the integrator is a non-linear function of lamp current which provides a substantially uniform time-response characteristic of the balancing action throughout a wide range of target temperatures. The gain of the balanceable system as a whole is adjusted to maintain constant the sensitivity of the system to changes in target temperature throughout a wide range of temperatures despite the circumstance that the signal output of the photomultiplier tube for a given change of temperature is greatly enhanced by the target temperature at which such change occurs.

In one commercial form the entire system, including its power supply and optics not illustrated, is a portable unit weighing about 45 pounds and whose overall dimensions are approximately 21" x 12" x 8".

It is understood the invention is not limited to the specific arrangements disclosed and that it comprehends modifications and equivalents within the scope of the appended claims.

What is claimed is:
1. An optical pyrometer system comprising:
   a standard lamp,
   modulator means for cyclically modulating radiant energy from a target of unknown temperature and from said standard lamp,
   means for producing an AC signal of amplitude dependent upon the difference between the modulated radiant energies from said standard lamp and said target of unknown temperature and of phase dependent upon which of said energies is the greater,
   means for producing timing pulses phase-locked to said AC signal,
   demodulator means controlled by said timing pulses for operating in synchronism with said modulator means and for producing unidirectional pulses of amplitude and polarity dependent upon the amplitude and phase of said AC signal,
   integrator means to which said unidirectional pulses are supplied to adjust the standard lamp current for matching of said energies, and
   an automatic gain-control circuit responsive to changes in standard lamp current for varying the duration of said unidirectional pulses in compensation for the disproportionate change of radiant energy from the target with change of its temperature.

2. An optical pyrometer system comprising:
   a standard lamp,
   modulator means for cyclically modulating radiant energy from said standard lamp and from a target of unknown temperature,
   means responsive to the modulated radiant energies from said standard lamp and said target for producing in each modulation cycle a pair of signal pulses of opposite polarity whose amplitude and relative polarity are dependent upon the difference between the radiation energies respectively from said standard lamp and said target of unknown temperature,
   means for producing timing pulses phase-locked to said signal pulses,
   a demodulator to which said signal and timing pulses are supplied to produce unidirectional pulses of amplitude and polarity dependent upon the magnitude and sense of the difference between said radiant energies,
   integrator means to which said unidirectional pulses are supplied to adjust the standard lamp current for matching of said radiant energies, and
   an automatic gain-control circuit responsive to changes in standard lamp current for varying the duration of said timing pulses in compensation for the change of radiant energy from the target with change of its temperature.

3. An optical pyrometer system comprising:
   a standard lamp,
   modulator means for cyclically modulating radient energy from said standard lamp and from a target of unknown temperature,
   means responsive to the modulated radiant energies from said standard lamp and said target for producing an AC signal of amplitude representative of the difference between radiant energies from said standard lamp and from said target of unknown temperature and of phase dependent upon which of said energies is the greater,
   demodulator means for deriving from said AC signals unidirectional pulses of amplitude and polarity dependent upon the amplitude and phase of said signal,
   means for phase-locking said unidirectional pulses to said AC signal,
   integrator means to which said unidirectional pulses are supplied to adjust the standard lamp current in sense and extent to effect matching of said radiant energies, and
   an automatic gain-control circuit responsive to changes in standard lamp current for varying the duration of said unidirectional pulses in compensation for the disproportionate change in radiant energy from the target with change of target temperature.

4. An optical pyrometer system as in claim 3 in which said automatic gain-control circuit includes a function generator responsive to the magnitude of the current flowing to said standard lamp producing for said demodulator means a control signal which varies non-linearly with standard lamp current.

5. An optical pyrometer system comprising:

a standard lamp, modulator means for cyclically modulating radiant energy from said standard lamp and from a target of unknown temperature, means responsive to the modulated radiant energies from said standard lamp and said target for producing in each modulation cycle a mismatch signal whose AC component in amplitude and phase correspond with the difference between radiant energies respectively from said standard lamp and said target of unknown temperature, a demodulator to which said AC component of the mismatch signal is applied and including electronic switching means, timing means for producing timing pulses phase-locked to said AC component and controlling said electronic switching means for production of unidirectional pulses of amplitude and polarity dependent upon the amplitude and phase of said AC component of the mismatch signal, integrator means to which said unidirectional pulses are supplied to adjust the standard lamp current for matching of said radiant energies, and an automatic gain-control circuit for varying the duration of said timing pulses inversely in accordance with the standard lamp current in compensation for the change in radiant energy from the target with change of its temperature.

6. An optical pyrometer system as in claim 5 in which the timing means includes a multivibrator switched to one state in synchronism with successive halfwaves of said AC component of the mismatch signal, and which includes a function generator responsive to the magnitude of the current flowing to said standard lamp for switching said multivibrator to opposite state after a time period predetermined by the standard lamp current.

7. An optical pyrometer system comprising:

a standard lamp, modulator means for cyclically modulating radiant energy from said standard lamp and from a target of unknown temperature, means responsive to the modulated radiant energies from said standard lamp and said target for producing an AC signal of amplitude representative of the difference between radiant energies from said standard lamp and from said target of unknown temperature and of phase dependent upon which of said energies is the greater, a demodulator including electronic switching means to which said AC signal is applied to produce unidirectional pulses, means associated with said modulator means for producing a timing wave phase-locked to said AC signal, means for differentiating said timing wave to produce trigger pulses, a multivibrator whose successive cycles are initiated by said trigger pulses, logic circuit means to which said timing wave and the multivibrator output pulses are applied to produce timing pulses controlling said electronic switching means to derive from said AC signal unidirectional pulses of amplitude and polarity dependent upon the amplitude and phase of said AC signal, integrator means to which said unidirectional pulses are supplied to adjust the standard lamp current in sense and to extent to effect matching of said energies, and a function generator deriving from the standard lamp current a bias level determining the duration of the output pulses of said multivibrator and so to vary the duration of said unidirectional pulses in compenstaion for the disproportionate change of radiant energy from the target with change of target temperature.

8. An optical pyrometer system comprising:

a reference source and a target source, modulator means for cyclically modulating radiant energy from said reference source and from said target source, means for producing an AC signal of amplitude dependent upon the difference between the modulated radiant energies from said sources and of phase dependent upon which of said energies is the greater, means for producing timing pulses phase-locked to said AC signal, demodulator means controlled by said timing pulses for producing unidirectional pulses of amplitude and polarity dependent upon the amplitude and phase of said AC signal, integrator means to which said unidirectional pulses are supplied to adjust the temperature of one of said sources for matching of said energies, and an automatic gain-control circuit responsive to changes in the radiant energy level at which matching is effected for varying the duration of said unidirectional pulses in compensation for the disproportionate change of radiant energy with change of temperature at different radiant energy levels.

References Cited

UNITED STATES PATENTS

| | | | |
|---|---|---|---|
| 1,958,879 | 5/1934 | Anthony | 88—22.5 |
| 3,068,746 | 12/1962 | Vawter | 88—22 |
| 3,076,090 | 1/1963 | Stapelfeldt | 73—355 X |
| 3,081,632 | 3/1963 | Howell | 73—355 |
| 3,157,728 | 11/1964 | Comstock | 88—22.5 |
| 3,163,700 | 12/1964 | Williamson | 88—22.5 |

JEWELL H. PEDERSEN, *Primary Examiner.*

W. A. SKLAR, *Assistant Examiner.*